3,655,686
PRODUCTION OF 3-CHLORO-1,2-BENZOISO-
THIAZOLES
Friedrich Becke, 4 Scheffelstrasse, 6900 Heidelberg, Germany, and Helmuth Hagen, 7 An der Froschlache, 6700 Ludwigshafen, Germany
No Drawing. Filed July 10, 1969, Ser. No. 840,830
Claims priority, application Germany, July 11, 1968,
P 17 70 853.1
Int. Cl. C07d 91/12
U.S. Cl. 260—304                           10 Claims

ABSTRACT OF THE DISCLOSURE

Production of 3 - chloro - 1,2 - benzoisothiazoles by reaction of 1,2-benzoisothiazoles with elementary chlorine, and the new 1,2-benzoisothiazoles themselves which are chemosterilizing agents for insects and intermediates for the production of dyes and pesticides.

---

The invention relates to the production of 3-chloro-1,2-benzoisothiazoles by reacting a 1,2-benzoisothiazole with elementary chlorine and to new substances of this kind.

It is known from Liebigs Annalen der Chemie, 454, 264 (1927) that 5-hydroxy-1,2-benzoisothiazoles and 5-amino-1,2-benzoisothiazoles can be chlorinated on the benzene nucleus. For example 5-hydroxy-1,2-benzoisothiazole is converted with chlorine into 4-chloro-5-hydroxy-1,2-benzoisothiazole and 4,6-dichloro-5-hydroxy-1,2-benzoisothiazole, and 5-amino-1,2-benzoisothiazole is converted into 4,4,6,6,7 - pentachloro - 6,7 - dihydro-1,2-benzoisothiazole-5-one. Substitution in the 3-position of the benzoisothiazole molecule has not been described.

It is an object of this invention to provide a new method of producing 3-chloro-1,2-benzoisothiazoles in a simple way and in good yields and purity. Another object of the invention is the new 3-chloro-1,2-benzoisothiazoles.

These and other objects of the invention are achieved and 3 - chloro - 1,2 - benzoisothiazoles having the general formula:

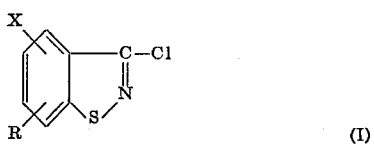

(I)

where R denotes a hydrogen atom, an aliphatic, cycloaliphatic, aromatic or condensed aromatic radical, a halogen atom or a nitro group, and X denotes a hydrogen atom or a halogen atom, are obtained advantageously by reacting a 1,2-benzoisothiazole having the general formula:

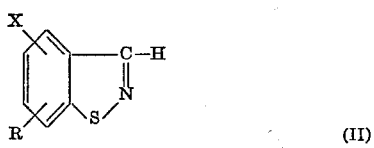

(II)

where R and X have the meanings given above with elementary chlorine in the presence of an organic acid chloride, acid anhydride or nitrile.

Having regard to the state of the art it is surprising that the process according to this invention should give 3-chloro-1,2-benzoisothiazole in a simple way and in good yield and high purity. It is particularly surprising that substitution of the benzene nucleus by chlorine does not occur to any appreciable extent and secondary reactions, for example oxidation of the starting material, do not play any part.

1,2-benzoisothiazoles having the general Formula II are used as starting materials and they may be readily obtained for example by reaction of dihalomethylaryl compounds with ammonia and elementary sulfur. Preferred starting materials (II) and consequently preferred end products (I) are those in whose formulae R denotes a hydrogen atom, an alkyl radical having one to six carbon atoms, a cycloalkyl radical having five to twelve carbon atoms, a phenyl radical, a condensed phenyl radical, a naphthyl radical, a condensed naphthyl radical, a chlorine atom or a nitro group and X denotes a hydrogen atom or a chlorine atom. For example the following 1,2-benzoisothiazoles may be used as starting materials (II): 1,2-benzoisothiazole, 4 - chloro - 1,2 - benzoisothiazole, 4-ethyl-1,2-benzoisothiazole, 5-cyclohexyl-1,2-benzoisothiazole, 4,5-dichloro-1,2-benzoisothiazole, 7-phenyl-1,2-benzoisothiazole, 5,6-phenyl-1',2'-benzoisothiazole and 4-nitro-1,2-benzoisothiazole.

The starting material (II) is reacted with elementary chlorine in a stoichiometric amount or in excess with reference to the starting material (II), preferably in an excess of from 10 to 50% by weight over the stoichiometric amount. The starting material may be chlorinated in the absence or presence of chlorination catalysts, for example iron (III) chloride, antimony (III) chloride, tin (IV) chloride, copper (II) chloride, aluminum chloride, phosphorus trichloride, or sulfuryl chloride.

The reaction is carried out in the presence of an organic acid, acid chloride, acid anhydride or nitrile. Aliphatic carboxylic acids or their derivatives are preferred, for example formic acid, acetic acid, acetonitrile, acetyl chloride, propionic acid, propionitrile, butyric acid, chloroacetic acid, cyanoacetic acid, dichloroacetic acid, trichloroacetic acid, isobutyric acid, caprylic acid, trimethylacetic acid, β-chloropropionic acid, glycolic acid, lactic acid, valeryl chloride, chloroacetyl chloride, and 1,3,5-pentanetricarbonitrile. Dicarboxylic acids or their derivatives are also suitable, for example tartaric acid, malonic acid, or succinic anhydride. The organic acids or the acids on which the derivatives are based may be polycarboxylic acids, although monocarboxylic acids are preferred. Acids or derivatives having up to twelve, preferably up to seven, carbon atoms are particularly suitable. The acids or their derivatives are generally used in an amount of from 1 to 10 moles, preferably from 1 to 3 moles, per mole of starting material (II).

The reaction is generally carried out at a temperature between 20° and 100° C., preferably from 50° to 80° C., at atmospheric or superatmospheric pressure, continuously or in batches.

The reaction may be carried out as follows: chlorine is passed for from ten to sixty minutes into a mixture of starting material (II) and the organic acid or a derivative thereof with or without a solvent at the reaction temperature. The end product is deposited in solid form in the reaction mixture during the reaction, and it is sometimes possible to improve the deposition of the end product by cooling and/or prolonged residence times of the mixture with thorough mixing. The end product is separated by a conventional method, for example by filtration.

The new compounds which can be prepared by the process according to the invention are chemosterilants for insects and valuable intermediates for the production of dyes and pesticides. For example when freshly hatched houseflies (*Musca domestica*) are given, in addition to water, a feed containing 0.1% by weight of 3,4-dichloro-1,2-benzoisothiazole, they are sterilized.

The invention is illustrated by the following examples. The parts specified in the examples are parts by weight.

EXAMPLE 1

170 parts of 4-chloro-1,2-benzoisothiazole is dissolved in 300 parts of glacial acetic acid and then 75 parts of clorine is passed into the solution at 50° C. during thirty minutes. The end product is deposited in crystalline form during the reaction. It is suction filtered and dried. 183 parts of 3,4-di-chloro-1,2-benzoisothiazole is obtained having a melting point of 130° C. and a boiling point of 165° to 167° C. at 11 mm. Hg. This is a yield of 90% of the theory.

EXAMPLE 2

The reaction according to Example 1 is carried out analogously with 300 parts of formic acid. 193 parts (95% of the theory) of 3,4-dichloro-1,2-benzoisothiazole is obtained.

EXAMPLE 3

68 parts of 4,5-dichloro-1,2-benzoisothiazole is dissolved in 400 parts of glacial acetic acid. 25 parts of chlorine is passed into this solution at 60° C. during thirty minutes. The end product is deposited during the reaction and is suction filtered after the mixture has been cooled. 72 parts of 3,4,5-trichloro-1,2-benzoisothiazole is obtained having a melting point of 157° to 158° C.; this is a yield of 90% of the theory.

What we claim is:

1. A process for the production of 3-chloro-1,2-benzoisothiazoles having the general formula

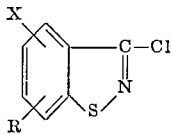

(I)

wherein R denotes a hydrogen atom, an alkyl radical having one to six carbon atoms, cyclohexyl, 5,6-phenylen, phenyl, a chloro or a nitro group and X denotes a hydrogen atom or a chloro group wherein a 1,2-benzoisothiazole having the general formula

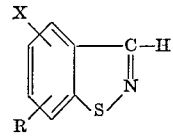

(II)

where R and X have the meanings given above is reacted with elementary chlorine in the presence of an alkanolic monocarboxylic acid having 1–7 carbon atoms optionally substituted by chloro, cyano or hydroxyl, or acid chlorides thereof.

2. A process as claimed in claim 1 wherein the reaction with elementary chlorine is carried out in an excess of 10 to 50% by weight over the stoichiometric amount with reference to starting material (II).

3. A process as claimed in claim 1 wherein the reaction is carried out in the presence of a chlorination catalyst.

4. A process as claimed in claim 1 wherein the reaction is carried out in the presence of the last-mentioned in an amount of 1 to 10 moles per mole of starting material (II).

5. A process as claimed in claim 1 wherein the reaction is carried out in the presence of said last-mentioned compound in an amount of 1 to 3 moles per mole of starting material (II).

6. A process as claimed in claim 1 wherein the reaction is carried out at a temperature of from 20° to 100° C.

7. A process as claimed in claim 1 wherein the reaction is carried out at a temperature of from 50° to 80° C.

8. A process as claimed in claim 1 wherein said last-mentioned compound is said alkanoic monocarboxylic acid.

9. A process as claimed in claim 1 wherein said last-mentioned compound is glacial acetic acid.

10. A process as claimed in claim 1 wherein said last-mentioned compound is formic acid.

References Cited

Boshagon et al.: Berichte, 1968, 101(7) pp. 2477–9.

ALEX MAZEL, Primary Examiner

R. J. GALLAGHER, Assistant Examiner

U.S. Cl. X.R.

424—270

PO-1050
(5/69)

UNITED STATES PATENT OFFICE
CERTIFICATE OF CORRECTION

Patent No. 3,655,686                    Dated April 11, 1972

Inventor(s) Friedrich Becke and Helmuth Hagen

It is certified that error appears in the above-identified patent and that said Letters Patent are hereby corrected as shown below:

Column 1, line 6, after "Germany", insert -- , assignors to Badische Anilin- & Soda-Fabrik Aktiengesellschaft, Ludwigshafen, Germany --; lines 71 to 72, "organic acid chloride" should read -- organic acid, acid chloride --.

Column 3, line 12, "clorine" should read -- chlorine --; line 47, claim 1, "5,6-phenylen," should read -- 5,6-phenylene, --.

Column 4, line 10, claim 1, "alkanolic" should read -- alkanoic -- line 21, claim 4, "last-mentioned" should read -- last-mentioned compound --.

Signed and sealed this 24th day of October 1972.

(SEAL)
Attest:

EDWARD M. FLETCHER, JR.
Attesting Officer

ROBERT GOTTSCHALK
Commissioner of Patents